May 6, 1930.    A. BENBINISTI    1,757,556

ICE CREAM CONE BAKING MACHINE

Filed April 27, 1928

INVENTOR
Albert Benbinisti,
BY
Gustav Drews
ATTORNEY

Patented May 6, 1930

1,757,556

UNITED STATES PATENT OFFICE

ALBERT BENBINISTI, OF NEW YORK, N. Y., ASSIGNOR TO NISSIN GERSHON, OF NEW YORK, N. Y.

ICE-CREAM-CONE-BAKING MACHINE

Application filed April 27, 1928. Serial No. 273,193.

This invention relates to machines for baking the dough forming sheets of ice-cream cones and the like.

Among the objects of the present invention it is aimed to provide an improved machine for baking the dough forming sheets of ice-cream cones, which machine is provided with mold plates for carrying the dough, and which mold plates during the baking process are actuated through an endless path but dispense with the use of a conveyor, conveying chain or the like for supporting or carrying the mold plates during the baking process.

It is still another object of the present invention to provide an improved machine for baking the dough forming sheets of ice-cream cones and the like having a plurality of mold plates for carrying the dough during the baking process in which each set of mold plates are removably associated with the machine so that when it is desired to repair a mold plate or set of mold plates or to clean the same, such single set of mold plates can readily be removed from the machine without disturbing the remaining mold plates and can again be replaced without the use of any tools or the like.

It is still another object of the present invention to provide an improved machine for baking the dough forming sheets of ice-cream cones having a plurality of mold plates for carrying the dough during the baking process in which each set of mold plates singly, or a plurality of them, or the entire series, can be removed when it is desired to repair or clean any part of the machine and the same again replaced without the use of any tools or the like. To this end it is still further an object of the present invention to provide an improved machine for baking the dough forming sheets of ice-cream cones having a plurality of mold plates for carrying the dough during the baking process in which access to any part of the machine relating to the driving mechanism, mold plates and the like can be readily effected without the use of any tools or the like.

It is still another object of the present invention to provide an improved baking machine for baking the dough forming sheets of ice-cream cones, which machine is provided with a plurality of mold plates that are actuated in an endless path during the baking process, which machine can be produced at comparatively low cost, and which is reduced to a minimum number of working parts whereby in turn the wearing parts of the machine are reduced to a minimum.

These and other features, capabilities and advantages of the present invention will appear from the subjoined detail description of one specific embodiment thereof illustrated in the accompanying drawings in which—

Figure 1:
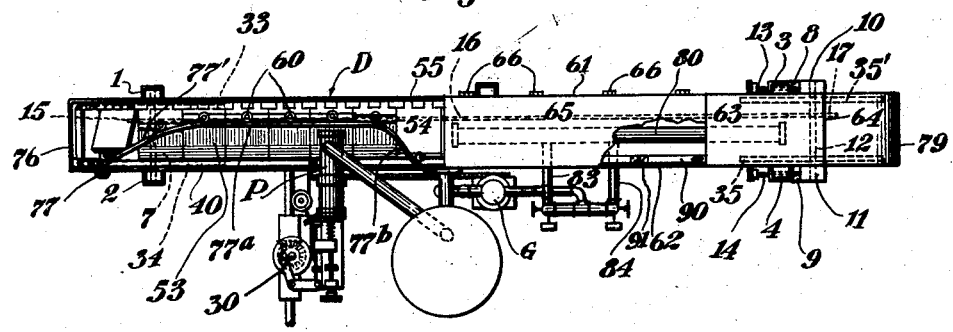
Figure 1 is a plan of the complete machine.

In the embodiment illustrated, there are provided two pairs of end supporting standards 1, 2, and 3, 4. The standards 1 and 2 are spaced from one another a distance substantially equal to the distance the standards 3 and 4 are spaced from one another and are anchored in such spaced relation by any suitable means, not shown. The standards 1 and 2 are further provided with journals 5 and 6 in alinement with one another to receive the shaft 7. The standards 3 and 4 are provided with outwardly extending brackets 8 and 9 on which are slidably mounted the journal boxes 10 and 11 in which is supported the shaft 12.

The journal boxes 10 and 11 are operatively connected with the adjusting screws 13 and 14 extending through the standards 3 and 4 whereby the position of the shaft 12 relative to the position of the shaft 7 may be adjusted.

On the shaft 7 there is fixed a sprocket wheel 15 which is connected by means of the sprocket chain 16 with the sprocket wheel 17 mounted on the shaft 12. The shaft 7 is also provided with a gear 18 in mesh with the gear 19 mounted on the shaft 20 which is suitably supported in the bracket 21 mounted on the housing portion 22 of the lower heating chamber.

The gear 19 is drivingly connected by means of a small gear to the variable speed transmission contained in the housing 24 which is operatively connected to the shaft 25 of the pulley 26, which is connected by means of the belt 27 to the pulley 28 of the shaft 29 of the motor M. The large gear 23, also on the shaft 20, is operatively connected to the shaft 30 of the dough feeding pump P.

The shaft 25 is also provided with a pulley 31 which is connected by the belt 32 with the gas pump G.

The dough feeding pump P and gas feeding pump G form no part of the present invention and it is therefore believed sufficient to merely describe their connection with the motor M.

On the shaft 7 adjacent to the standard 1 and to the inside thereof, there is fixed a rotor 33. A rotor 34 similar to the rotor 33 is fixed on the shaft 7 to the inside of the standard 2.

To the inside of the standards 3 and 4 there are provided similar rotors 35 and 35'.

Extending on the inside of the standards 1 and 3 and from one to the other near their upper ends above the shafts 7 and 12 there is provided the rail member 36 having an upper flange member 37 and a lower flange member 38.

To the inside of the standard 2 and standard 4 there is also provided a rail member 39, which likewise extends above the shaft 7 and shaft 12, which rail member 39 has an upper flange member 40 and a lower flange member 41.

The upper flange member 37 extends from the rotor 33 to the rotor 35' and around their peripheries down to and continues into the lower flange member 42 of the rail member 43. The lower flange 38 of the rail member 36 extends to the peripheries of the rotors 33 and 35' and is opposed at its ends by such rotors 33 and 35'.

The upper flange 40 of the rail member 39 similarly extends around the peripheries of the rotors 34 and 35 down to and continues into the lower flange 44 of the rail member 45, while the lower flange 41 of the rail member 39 extends to the peripheries of the rotors 34 and 35 and is opposed at its ends by such rotors 34 and 35.

Figure 2:
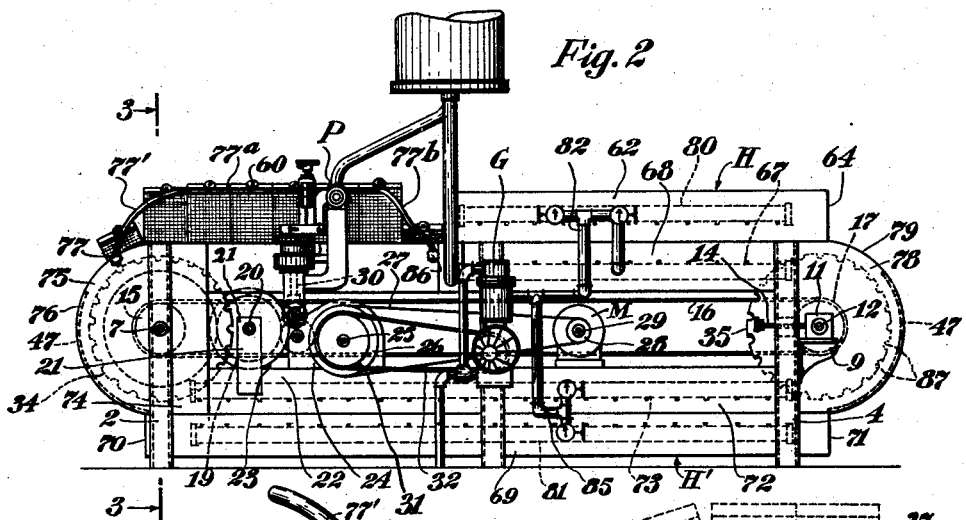
Fig. 2 is a side elevation of the same partly in section.

To the inside of the standards 2 and 4 below the rail member 45 there is provided the rail member 46 which has a lower flange 47 which as shown in Fig. 2, extends from a level above the shaft 7 outside of the periphery of the rotor 34 and then down below the rail member 45 to the rotor 35 and then up and in an arcuate direction adjacent to the outside of the periphery of the rotor 35 to a level above the shaft 12.

The rail members 36 and 39 are adapted to receive the supporting rollers 48, 49, and 50, 51, of the lower mold plates 52 while these mold plates 52 move through the dough supplying station D adjacent to the dough supplying pump P to the upper heating chamber H, and the rail members 43 and 45 support the supporting rollers 48, 49, and 50, 51, of the lower mold plates 52 while the mold plates pass through the lower heating chamber H'.

Figures 3, 4:
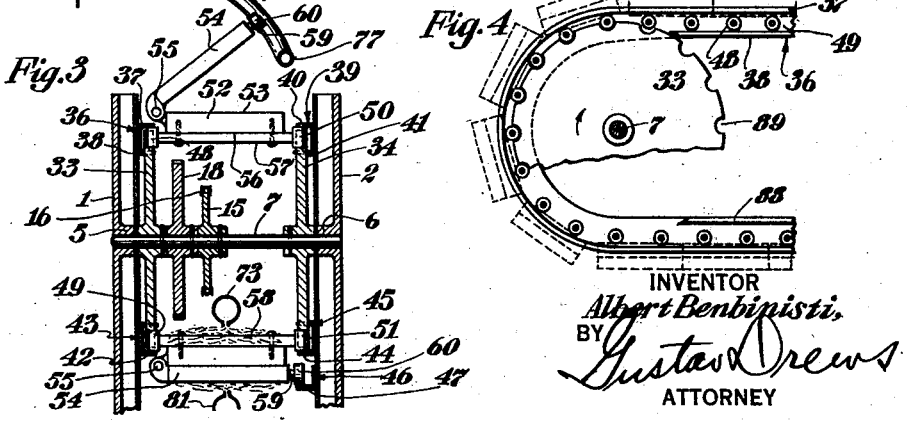
Fig. 3 is a section on the line 3—3 of Fig. 2.
Fig. 4 is an enlarged fragmental detail showing the association of the mold plates with one of the rotors, the one transferring the mold plates from the lower heating chamber to the upper heating chamber.

The mold plates consist essentially of the lower mold plates 52, on the face 53 of which, see Fig. 3, the dough is received, and the upper mold plates or closure members 54, each of which is hingedly connected to one end of a lower mold plate 52 by the hinged member 55. The rear and front edges or faces of the mold plates, see Fig. 4, are smooth or plane to form contacting faces for the adjacent mold plates. To the face 56 of each mold plate 52 there are preferably secured a pair of bars 57, 58, the ends of which are formed to receive the rollers 48, 50, 49, 51, respectively. To the free end of each upper mold plate 54, there is formed a stub shaft 59 to receive the cam roller 60.

When the mold plates 52, 54, pass from the upper heating chamber H to the lower heating chamber H', the cam roller 60 will rest on the flange 47 to maintain the mold plates 54 in closed position, see Fig. 3.

The upper heating chamber H consists essentially of an upper hood member preferably composed of sheet metal or the like having a rear wall 61 and a front wall 62 extending from the dough supplying station D to the right hand end of the machine. The wall members 61 and 62 have a horizontal top wall member 63 preferably fixed thereto and an end closed wall member 64, the top wall member 63 starting a little beyond the dough supplying station D and terminating at the end wall member 64. From the top wall member 63 to the dough supplying station D, a removable cover member 65 is hingedly secured to the rear wall member 61 by means of the hinged members 66, the front end of the top wall member 65 resting on the upper edge of the front wall 62. The rear wall member 61 preferably extends down to and below the rail member 36 a sufficient distance to enclose the lower burner tube 67. The front wall 62 is preferably provided with a skirt member 68 extending down from the wall member 62 down to and beyond the burner tube 67.

The heating chamber H' consists essentially of a lower housing having front and rear wall members 69 extending from the outside of the standards 1 and 2 to and beyond the outside of the standards 3 and 4, and are provided with end wall members 70 and 71 to close the ends of such housing. Above the wall members 69, there are provided wall members 72 forming the housing 22 which extend from the top of the wall memebrs 69 to and beyond the burner tube 73, and also extend from the standards 3 and 4 to the wall members 74 secured to the standards 1 and 2.

To either side of the rotors 33 and 34, there are formed the wall members 75 which are secured to the standards 1 and 2.

To the edges of the wall members 75 there is formed a curved wall member 76 which extends from the cam 77 down to the end wall member 70. To either side of the rotors 35 and 35′ there are formed the wall members 78 which are secured to the standards 3 and 4. From the end wall members 64 of the upper heating chamber H, there extends the curved wall member 79 which is secured to the outer edges of the wall members 78 and extends down to the upper end of the end wall member 71.

Between the wall members 61 and 62 of the upper heating chamber H, there is provided the burner tube 80 which has downwardly extending burner nozzles. The burner tube 67, which is disposed beneath the level of the rails 36 and 39, has upwardly extending burner nozzles. The burner tubes 67 and 80 extend from the dough supplying station D to the standards 3 and 4.

The burner tube 73, disposed between the wall members 72, has downwardly extending burner nozzles and extends from a point adjacent to the standards 1 and 2 to the standards 3 and 4. Beneath the burner tube 73 and below the path of movement of the mold plates in the lower heating chamber, there is formed the burner tube 81 which extends from a point adjacent the standards 1 and 2 rearwardly to the standards 3 and 4. The burner tube 81, as illustrated, has upwardly extending burner nozzles. The burner tube 80 is connected to the main conduit 82 of the gas supply by means of the short conduit 83. The burner tube 67 is connected to the conduit 82 by means of the conduit 84, and by suitable connections the burners 73 and 81 are connected to the conduit 85, which is connected to the main conduit 82.

From the left hand free end of the wall members 61 and 62 of the upper heating chamber to the upper end of the curved wall member 76, the mold plates are exposed and no hood or housing provided to cover the same during this portion of their path of movement which is generally designated as the dough supplying station. It is of course understood that before the mold plates reach the position beneath the pump P, the baked dough sheets must be removed and this takes place in the location or situation between the upper end of the wall member 76 and the pump P.

From the upper end of the wall member 76 there extends the cam member 77 which has an arcuate opening cam portion 77′ and a straight portion 77$^a$ extending above the path of movement of the mold plates and beyond the pump P to the downwardly bent portion 77$^b$ which extends down and is connected to the bracket 86 secured to the wall member 68.

The cam bar 77 is adapted to extend into the path of movement of the rollers 60 of the upper mold plates 54 when they pass the wall member 76 so that the roller 60 will ride upon the cam bar 77 and raise the upper mold plates 54 as they approach the pump P so that the baked sheet can here be removed, and maintain the upper mold plates 54 in raised position as they pass the pump P so that a fresh supply of dough may be discharged onto the then exposed lower mold plates 52. As the mold plates continue in their movement, the cam bar 77 will permit the rollers 60 to thereupon descend and permit the upper mold plates 54 to rest on the lower mold plates 52 as they enter the upper heating chamber H.

When the mold plates pass into the upper heating chamber H they will pass between the burner tubes 80 and 67, and the dough contained by them will be subjected to the baking treatment. When the mold plates reach the rotors 35 and 35′, they will pass from the rails 36 and 39 onto the rotors 35 and 35′.

The notches 87 on the rotors 35 and 35′ are spaced from one another a distance corresponding to the distance between two adjacent rollers of the lower mold plates 52 so that the notches 87 of the rotors 35 and 35′ will receive the rollers of the lower mold plates 52 as they leave the rail members 36 and 39, actually carrying the mold plates 52 and 54 around the rotors 35 and 35′ down to the rail members 43 and 45 of the lower heating chamber H′.

In the lower heating chamber, as heretofore explained, the rollers 60 of the upper mold plates 54 will be received by the flange 47 of the rail member 46 and the upper mold plates 54 will thereby be maintained in engagement with the lower mold plates 54 in closed position while the mold plates 52, 54, pass between the burner tubes 73 and 81. When the mold plates 52 and 54 reach the rotors 33 and 34, they will leave the upper flanges 88 of the rail members 43 and 45, see Fig. 4, and be received by the notches 89 of the rotors 33 and 34 engaging the rollers of the lower mold plates 52 to transfer the mold plates 52 and 54 from the lower heating chamber upwardly to the rail members 36 and 39, where the rollers 60, as heretofore explained, will engage the cam bar 77 to open the upper mold plates.

In the operation of the machine as above described, it will appear that the number of mold plates will be determined by the length of the path of movement from the rotors 33, 34, over the rail members 36, 39, to the rotors 35, 35', and then along the rail members 43 and 45 back to the rotors 33, 34, and that the mold plates will be disposed one against the other and be confined in their movement by the engagement of the rollers 48, 49, and 50, 51, by the flanges of the rail members 36, 39, and 43, 45, and the several rotors and the opposing flanges.

From the foregoing it will also appear that by this combination and association of parts, the mold plates need not be permanently attached to any chain or conveyor, and that when so confined by the flanges of the rail members, they are independent of one another, are exclusively guided by the rail members and the engagement with adjacent pairs of mold plates, and can readily be removed from the machine by merely removing a portion of one of the flange members. For this purpose, a portion of the flange member 40, to wit the portion 90, disposed beneath the cover member 65, is hingedly connected at 91. Consequently, when the cover member 65 is open and the portion 90 is removed, any combination of mold plates 52, 54, disposed by the opening thus formed by the flange portion 90 can then be removed, and likewise any other set of mold plates removed through this opening by advancing the set of mold plates to be removed to such opening.

It is obvious that various changes and modifications may be made to the details of construction without departing from the general spirit of the invention as set forth in the appended claims.

I claim:

1. In a baking machine, the combination with two sets of rail members, one set disposed adjacent to the other, two sets of transferring rotors rotatable about horizontal axes, a plurality of sets of mold plates, each set being removable independent of each other set and exclusively controlled by said rail members and the engagement with its adjacent sets, the mold plates of each set being connected to one another, one set of rotors being operatively associated with said sets of rail members to engage one of the mold plates of a set to transfer the mold plates from one set of rail members to the second set of rail members, the other set of rotors being operatively associated with said rail members to engage one of the mold plates of a set to transfer the mold plates from the second set of rail members back to the first set of rail members, the sets of mold plates engaging adjacent sets of mold plates when disposed on said rail members so that the actuation by said rotors will cause the advancement of said sets of mold plates along said rail members, and heating chambers associated with said rail members so that the movement of said mold plates along said rail members will cause said mold plates to pass through said heating chambers.

2. In a baking machine, the combination with a heating chamber, of a filling station; a plurality of sets of mold plates, each set being removable independent of each other set, each set of mold plates consisting of a lower mold plate, an upper mold plate hingedly connected at one side to one side of said lower mold plate, and supporting rollers disposed at each side of the lower mold plate; a pair of parallel guide rails having upper and lower flanges, one guide rail engaging the supporting rollers on one side of said lower mold plates and the other guide rail engaging the supporting rollers on the other side of said lower mold plates to anchor the same against displacement and extending through said filling station and said heating chamber; and actuators for successively engaging the lower mold plate of each set to impart movement to the same, said sets of mold plates being disposed adjacent to one another so that the actuation of one will cause the other to advance with it and exclusively guided by said guide rails and the engagement with adjacent mold plates.

3. In a baking machine, the combination with a heating chamber, of a filling station; a plurality of sets of mold plates, each set of mold plates consisting of a lower mold plate, an upper mold plate hingedly connected at one side to one side of said lower mold plate, and supporting rollers disposed at each side of the lower mold plate; guide rails having upper and lower flanges to engage the supporting rollers of said lower mold plates to anchor the same against displacement and extending through said filling station and said heating chamber; and actuators for successively engaging the mold plates to impart movement to the same, said mold plates being disposed adjacent to one another so that the actuation of one will cause the others to advance with it, a portion of said guide rails being removably connected to facilitate removal of a set of mold plates from said guide rails.

4. In a baking machine, the combination with a heating chamber, of a filling station; a plurality of sets of mold plates, each set of mold plates consisting of a lower mold plate, an upper mold plate hingedly connected at one side to one side of said lower mold plate, and supporting rollers disposed at each side of the lower mold plate; guide rails having upper and lower flanges to engage the supporting rollers of said lower mold plates to anchor the same against displacement and extending through said filling station and said heating chamber; actuators for successively engaging the mold plates to impart movement to the same, said mold plates being disposed adjacent to one another so that the actuation of one will cause the others to advance with it; a housing for said heating chamber having a hingedly connected partition to afford access to the interior of the heating chamber; and a portion of the guide rails disposed in said heating chamber; and a portion of the guide rails disposed in said heating chamber being hingedly connected to facilitate removal of a set of mold plates.

5. In a baking machine, the combination with a filling station, of heating chambers, main upper guide rails extending through said filling station and one of said heating chambers; main lower guide rails extending through the other of said heating chambers; actuating rotors rotatable about horizontal axes and disposed adjacent to the ends of said guide rails to transfer mold plates from one set of guide rails to the other; a plurality of sets of mold plates, each set of mold plates being removable independent of each other set and exclusively guided by said guide rails and the engagement with its adjacent sets having a lower mold plate adapted to be engaged by said rotors, an upper mold plate hingedly connected at one side to said lower mold plate, supporting rollers secured at the sides of said lower mold plate and cooperating with said guide rails, and a cam roller disposed at the free side of said upper mold plate; said guide rails having upper flanges and lower flanges and cooperating with said actuating rotors to engage said supporting rollers and anchor the same against accidental removal; an auxiliary guide rail disposed below said guide rails to engage said cam roller when said mold plates travel on said main lower guide rails to maintain a set of guide plates in closed position; and a cam bar operatively associated with said filling station to engage said cam roller and raise said upper mold plate to facilitate removing the baked dough sheet and feeding a fresh dough supply on said lower sheet.

6. In a baking machine, the combination with a filling station, of heating chambers; main upper guide rails extending through said filling station and one of said heating chambers; main lower guide rails extending through the other of said heating chambers; actuating rotors rotatable about horizontal axes and disposed adjacent to the ends of said guide rails to transfer mold plates from one set of guide rails to the other; a plurality of sets of mold plates, each set of mold plates being removable independent of each other set and exclusively guided by said guide rails and the engagement with its adjacent sets having a lower mold plate adapted to be engaged by said rotors, an upper mold plate hingedly connected at one side to said lower mold plate, supporting rollers secured at the sides of said lower mold plate and cooperating with said guide rails, and a cam roller disposed at the free side of said upper mold plate; said guide rails having upper flanges and lower flanges and cooperating with said actuating rotors to engage said supporting rollers and anchor the same against accidental removal; an auxiliary guide rail disposed below said guide rails to engage said cam roller when said mold plates travel on said main lower guide rails to maintain a set of guide plates in closed position; and a cam bar operatively associated with said filling station to engage said cam roller and raise said upper mold plate to facilitate removing the baked dough sheet and feeding a fresh dough supply on said lower sheet, there being notches in said actuating rollers to engage said supporting rollers to impart a feeding action successively to said mold plates, said mold plates being disposed in an endless row along said guide rails and actuating rotors, each set of mold plates engaging its adjacent sets of mold plates while disposed on said main upper and lower guide rails so that the successive actuation of said mold plates by said rotors will cause the endless row of mold plates to advance.

7. In a baking machine, the combination with a heating chamber, of a filling station, a plurality of pairs of mold plates, each pair of mold plates consisting of a lower mold plate and an upper mold plate, the upper mold plate being hingedly connected at one side to one side of said lower mold plate, a pair of parallel guide rails forming an endless path, each guide rail engaging and supporting one side of each lower mold plate to guide and support the same through said endless path, said pairs of mold plates being removable independent of each other pair, and actuators rotatable about horizontal axes for successively engaging the lower mold plate of each pair to impart movement to the same, said mold plates being exclusively supported by said rails and the engagement with its adjacent mold plates so as to be removable without affecting an adjacent mold plate but disposed adjacent to one another so that the actuation of one pair will cause the others to advance with it.

ALBERT BENBINISTI.